Jan. 11, 1927.　　　　　E. A. LARSSON　　　　　1,614,201

TROLLEY BASE

Filed April 17, 1924

H. J. Stromberger.

Ernst A. Larsson, Inventor

By

Attorney

Patented Jan. 11, 1927.

1,614,201

UNITED STATES PATENT OFFICE.

ERNST A. LARSSON, OF MANSFIELD, OHIO, ASSIGNOR TO THE OHIO BRASS COMPANY, OF MANSFIELD, OHIO, A CORPORATION OF NEW JERSEY.

TROLLEY BASE.

Application filed April 17, 1924. Serial No. 707,067.

My invention relates to trolley bases for positioning on the roof of a car and supporting a trolley pole with a current collector at the end thereof and for maintaining the current collector in spring pressed relation to an overhead conductor.

The object of my invention is to provide a trolley base which is freely rotatable about a fixed vertical axis in order to permit the current collector to maintain its position on the trolley wire with side-swaying of the car; to yieldingly permit vertical adjustment of the trolley pole in a vertical plane in order to permit the current collector to maintain engagement with the trolley wire under varying heights of the trolley wire with respect to the car; and to provide means to yieldingly resist the upward movement of the trolley pole should the current collector leave the trolley wire, and means to provide a yielding sliding contact between the two main relatively rotatable parts of the base in order to afford a better electrical connection between these parts.

My invention resides in the new and novel construction, combination and relation of the various parts fully described hereinafter and disclosed in the drawing accompanying this specification.

Figure 1:
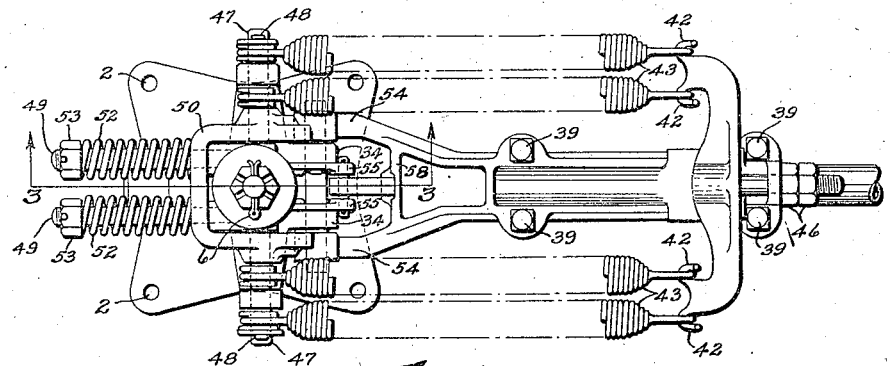
Fig. 1 is a top plan view of my invention showing a broken section of the trolley pole secured thereto.
Figure 2:
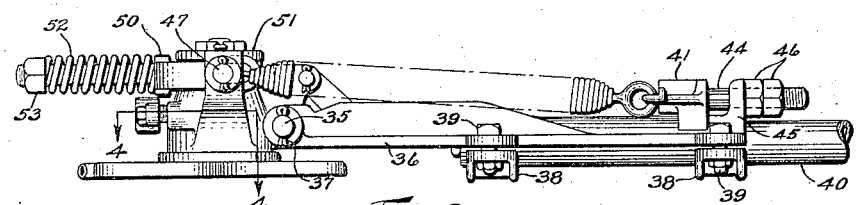
Fig. 2 is a side plan view of my invention shown in Fig. 1, showing the trolley pole and base parts secured thereto in a lowered position.
Figure 3:
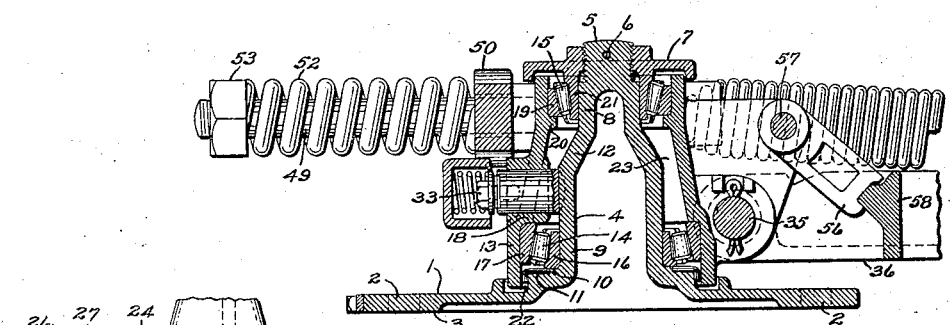
Fig. 3 is a sectional view on the line 3—3 of Fig. 1.
Figure 4:
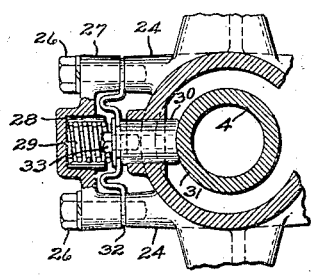
Fig. 4 is a sectional view on the line 4—4 of Fig. 2.

In the preferred embodiment of my invention I employ a base member 1 provided with openings 2 in the flange 3 for securing the device to the top of a car. Projecting upwardly from the flange 3 is a hollow pedestal 4 open at the bottom and closed at the top, and having its upper exterior end threaded, as at 5, and provided with a transverse hole to receive the pin 6. Secured to the pedestal 4 at its upper end, by means of the threads 5, is a rotatable cap 7 and provided with cross grooves, as shown in Fig. 1, to receive the transverse pin 6 by means of which the cap 7 may be locked in an adjusted position. The pedestal 4 is provided with a reduced portion 8 at the upper end and enlarged portion 9 at the lower end and the shoulder 10 and adjacent shoulder 11, as later described. The portions 8 and 9 are connected by the portion 12 having a conically disposed exterior surface.

Mounted upon the pedestal 4 is a turret 13. Interposed between the turret 13 and the pedestal 14 are two sets of anti-friction cone bearings 14 and 15 at the lower and upper end of the pedestal respectively. The race member 16 of the lower set of cone bearings rests upon the shoulder 10 and the outer race 17 is positioned within the cavity of the turret member 13 and is preferably secured in position by a driving fit, or other means to secure it permanently in place. The race 17 abuts against the shoulder 18 to prevent its displacement upwardly. The race 19 also forms a driving fit in the upper end of the turret 13 and rests against the shoulder 20. It will be noted that when the cap 7 is placed in position with the parts thus far described assembled, that when the cap 7 is adjusted into position, it will press against the race member 21 and tend to move the race 21 and the cones 15 secured thereto downwardly which in turn will press against the race 19 and which in turn will tend to move the turret member 13 downwardly and the race 17 into engagement with the cones 14. After the cap 7 has been adjusted into position so as to prevent axial movement of the parts 4 and 7 relative to each other, the pin 6 is secured in position, locking the cap 7 against displacement.

I find that this construction gives a high degree of easy rotation of the parts 4 and 13 about their common axis, and prevents any lost motion between these parts. I also find that the cone bearing is better than a ball bearing, usually employed, as it tends to stand up under the severe requirements much better than the ball bearing due probably to the pressure per unit area being much less.

Between the lower portion of the member 13 and the lower end of the pedestal 4 is a small space, and this is filled by means of a leather packing 22 which is positioned upon the shoulder 11 and is also pressed downwardly from above by the race 16. The leather packing 22 closes the space between the members 4 and 13 and permits the space 23 between the members 4 and 13 to be filled with grease or even a semi-liquid oil without the same oozing out at the bottom. This is an important part of my invention as I am able to have the moving parts in connection with the base and turret constantly lubricated and at the same time prevent the same from running out and over the surface of the car roof. Intermediate the upper and lower end of the turret 13 and on opposite sides thereof, but projecting in the same direction, are two bosses 24. Secured to the members 24 by means of the bolts 26 is a yoke member 27 provided with a cup shaped recess 28 in which is positioned a spring 29 tending to constantly press inwardly a contact member 30, the inner end of which is shaped to the surface 31 of the pedestal 4. The member 30 is preferably made of copper on account of its high electrical conducting properties. As shown, the member 30 passes through the side wall of the member 13 and makes a fairly snug fit, but permitting a reciprocating movement of the member 30. The spring 29 tends to constantly urge the member 30 into engagement with the pedestal 4. At the outer end of the member 30 is a flexible band 32 of copper which is secured thereto by the bolt 33 and also secured between the parts 24 and 27, thereby offering a low resistance, high current conducting path between the parts 4 and 13 thereby reducing to a very small quantity the current which would flow between these parts through the medium of the cone bearings 14 and 15.

Mounted on opposite sides of the turret member 13 and projecting in the same direction therefrom, are lugs 34 to which is pivotally mounted, by means of the pin 35, the yoke shaped arm 36. The pin 35 is secured in position by the spring cotter 37 which prevents lateral movement thereof. The yoke member 36 can pivot in a vertical plane about the pin 35 and is provided with two clamp members 38 provided with bolts 39 whereby the trolley pole 40 is secured in fixed position on the yoke member 36. Slidably mounted in relation to the end of the yoke member 36 is a member 41 provided with lugs 42 to which are secured the springs 43. The member 41 is secured to the member 36 by means of the projecting pin 44 which passes through the projecting member 45 and is held in adjustable relation thereto by means of the nuts 46 whereby the member 41 may be moved toward or away from the center of the base and held in adjusted position. This movement of the member 41 permits increasing or decreasing the tension of the springs 43 which have their opposite ends secured to the turret member 13. Projecting from opposite sides of the turret member 13, in opposite directions to each other and in the opposite direction of projection of the lugs 34 are pins 47 to which is secured one end of each of the springs 43, spaced apart upon the pins 47 and secured against lateral displacement by means of the spring cotter 48. Projecting from the opposite sides of the turret 13 and in the same direction as the lugs 24 and on the same side thereof, are two pins 49 upon which is slidably mounted a yoke member 50. The sides of the yoke member are provided with an elongated slot 51 through which pass the pins 47 and which pins assist in supporting the yoke 50, but permitting a reciprocating movement thereof. The yoke member 50 is yieldingly maintained in a forward position by means of the springs 52 which surround the pins 49 and are held in compression against the yoke member 50 by means of the nuts 53. The yoke member 50 acts as a spring buffer for the yoke member 36 when it flies upward, as in case the current collector leaves the trolley wire. The extreme ends of the yoke member 50 rest in the path of the arms 54 of the member 36 so that when the member 36 has moved upwardly about its pivotal point a predetermined amount, the arms 54 will engage the projecting ends of the member 50 and will be stopped from further upward movement under the yielding action of the springs 52.

Projecting from the lugs 34 are other lugs 55 between which is positioned the latch 56 and held in position by the pin 57. The latch 56 normally hangs downwardly by gravity, but may be raised up manually at will and made to engage with the cross bar 58 of the arm 36 thereby retaining the arm 36 in a depressed or downward position. This is an advantage where two trolley poles are used on a car, one at a time, depending upon the direction of operation of the car, or where it is desired to hold the poles down, as in the case of where the cars are stored at night in a barn. The engagement of the latch 56 with the arm 36 is easily disengaged by merely pulling the pole down a sufficient distance when the latch 56 will automatically release from the cross bar 57 through gravity.

It will be noted that in assembling the turret 13 upon the pedestal 4 that the member 30 will naturally be pressed inwardly to a greater degree than normal, therefore, having the top of the pedestal reduced in diameter from that of the lower portion and connecting the two portions by a conically shaped side of the intermediate portion 12. The parts 4 and 13 can be easily assembled without the pin 30 interfering therewith, as the parts are so proportioned that the pin will pass the part 8 of the pedestal without interference and when it reaches the conically shaped surface of the part 12 the pin 30 will be caused to move outwardly as will be evident, as the turret moves downwardly when the pin 30 will finally reach its seat against the surface of the part 9 when the turret has moved downwardly to its ultimate seat.

The two anti-friction means shown in the drawings comprising the parts 15, 19, 21 and 16, 17 and 16 comprise anti-friction bearings known among the trade as Timken bearings in which the inner race-way and the conically surfaced rollers are non-detachably secured together by means of a cage member and the outer race-way engaging the outer surface formed by the surface of the rollers.

It will be seen that with this construction the trolley pole is pivotally mounted on the turret and moved not only in a vertical plane and always urged upwardly by means of springs, but also moves about the axis of the pedestal. It will also be seen that the upward movement of the pole beyond a predetermined height will be spring buffed, and that there is means for maintaining the trolley pole in a depressed position at will. The turret and pedestal members form a recess which is closed at the bottom by a yielding packing member and forms a receptacle for a lubricating element and that the assembled turret, pedestal and anti-friction members are maintained against displacement by adjustable means which also adjusts the lost motion between these parts.

There are many modifications in the construction which I have herein disclosed as being my preferred construction, all of which fall within the scope of my invention, therefore, I do not wish to be limited otherwise than by my claims.

I claim:

1. A trolley pole base comprising a pedestal member provided with two diameters, one at either end, and a turret member pivotally mounted on the pedestal member, anti-friction members interposed between the two members, one at either diameter, and forming with the walls of the first two members a receptacle, packing means to close the space between the first two members at their lower ends, means to secure a trolley pole to the turret member, connecting means secured to the turret and pressing against the pedestal in movable relation thereto to conduct current from the turret to the pedestal and a yielding conducting member secured to the conducting means and to the turret member.

2. A trolley base comprising a pedestal member provided with two diameters connected by a section having a conical surface, a turret member pivotally mounted on the pedestal member, spaced anti-friction members interposed between the turret member and the two diameter portions of the pedestal member, means interposed between the pedestal and turret members to close any space therebetween at their lower end, means mounted on the pedestal member in adjustable relation thereto and engaging one of the anti-friction members to hold the parts assembled but not in engagement with the turret member and spring-held-reciprocating means mounted on the turret and engaging the pedestal in rotatable relation thereto and connected to the turret by a flexible conductor.

3. A trolley base comprising a pedestal member and a turret member mounted on the pedestal member in rotatable relation thereto, the pedestal member having two diameters, anti-friction means interposed between the above parts at each diameter, means engaging one anti-friction member to maintain the same and the turret member against longitudinal movement in one direction and another anti-friction means maintaining the turret member against longitudinal movement in the other direction, means to maintain the parts in adjustable relation, means secured to the turret member to support a trolley pole and spring-held-reciprocating means mounted on the turret and engaging the pedestal in rotatable relation thereto and electrically connected to the turret by a flexible conductor.

4. A pedestal for a trolley base comprising a plate-like formation, a member projecting therefrom to support a turret member having a trolley pole mounted thereon, the projecting member having a large diameter adjacent the plate-like formation and a smaller diameter at the opposite end of the projecting member and a cone-shaped formation connecting the parts of different diameters and beginning where the smaller diameter part ends and ending where the larger diameter part begins, thus avoiding shoulders, spring-held-reciprocating means mounted on one part and engaging the other part in rotatable relation thereto and flexible conducting means secured to the reciprocating means and to the said one part.

5. A trolley base comprising a pedestal and a turret axially mounted for relative rotation about a common axis, a trolley pole mounted on the turret member, conducting means secured to the turret and pressing against the pedestal in movable relation thereto to conduct current from the turret to the pedestal and a yielding member secured to the conducting means and to the turret member to conduct current.

6. A trolley base comprising a pedestal and a turret axially mounted for relative rotation about a common axis, spring-held means interposed between the turret and the pedestal and in movable relation to one of the above parts to conduct current from one part to the other, a trolley pole secured to the turret and a flexible member of high electrical conductivity connected to the spring-held means and to the turret member to increase the current carrying capacity between the spring-held means and the turret.

7. A trolley base comprising a pedestal and a turret axially mounted for relative rotation about a common axis, yieldable reciprocating means mounted on one part and engaging the other part in rotatable relation thereto and having a flexible member connecting the reciprocating means and the turret and a trolley pole mounted on the turret.

8. A trolley base comprising a pedestal and a turret axially mounted for relative rotation about a common axis, spring-held-reciprocating means mounted on one part and engaging the other part in rotatable relation thereto, anti-friction means interposed between the pedestal and turret, a trolley pole mounted on the turret and flexible conducting means secured to the reciprocating means and to the said one part.

9. A trolley base comprising a pedestal and a turret axially mounted for relative rotation about a common axis, spring-held-reciprocating means mounted on the turret and engaging the pedestal in rotatable relation thereto and connected to the turret by a flexible member to better conduct current from the turret to the pedestal and a trolley pole mounted on the turret.

10. A trolley base comprising a pedestal and turret axially mounted for relative rotation about a common axis, spring-held-reciprocating means mounted on the turret and engaging the pedestal in rotatable relation thereto and electrically connected to the turret by a flexible member, anti-friction means interposed between the turret and the pedestal, means to close the space between the turret and the pedestal at their lower end and means on the turret to secure a trolley pole thereto.

11. A trolley base comprising a pedestal, a turret rotatably mounted thereon, an arm pivotally mounted on the turret to move vertically, spaced anti-friction means interposed between the pedestal and turret, means to close the opening between the pedestal and turret to form a receptacle thereof closed at the bottom for lubricating material, a spring operating to move the arm about its pivotal point, yielding means between the base and turret to increase the current conducting relation therebetween, resilient means on the turret to arrest upward movement of the arm and means secured to the pedestal to prevent the displacement of the parts after assembly.

In testimony whereof I affix my signature.

ERNST A. LARSSON.